Oct. 15, 1946.　　　　E. F. FISHER　　　　2,409,479
GRINDING AND POLISHING BOOTH
Filed April 29, 1943　　　3 Sheets-Sheet 1
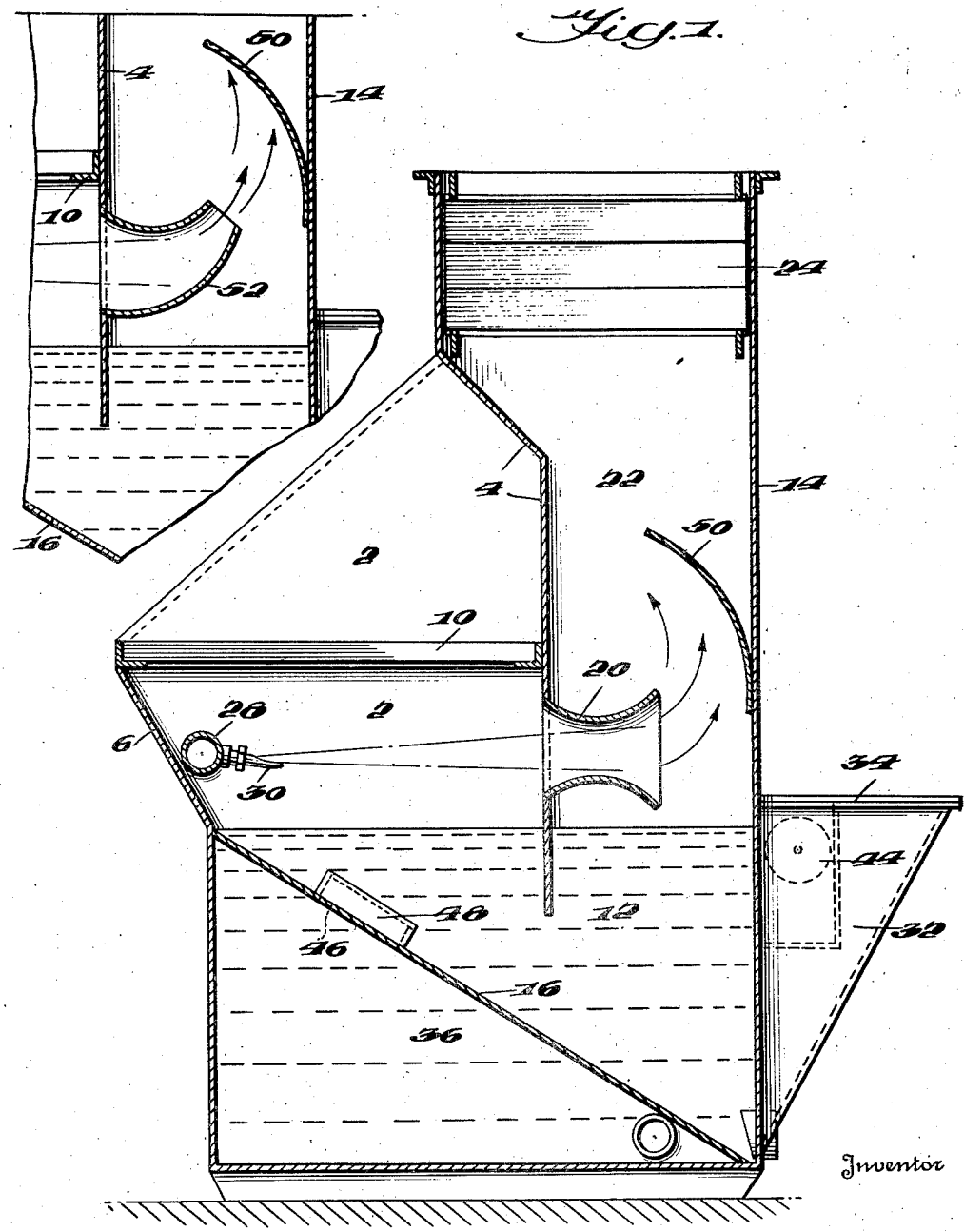
Inventor
ERNEST F. FISHER

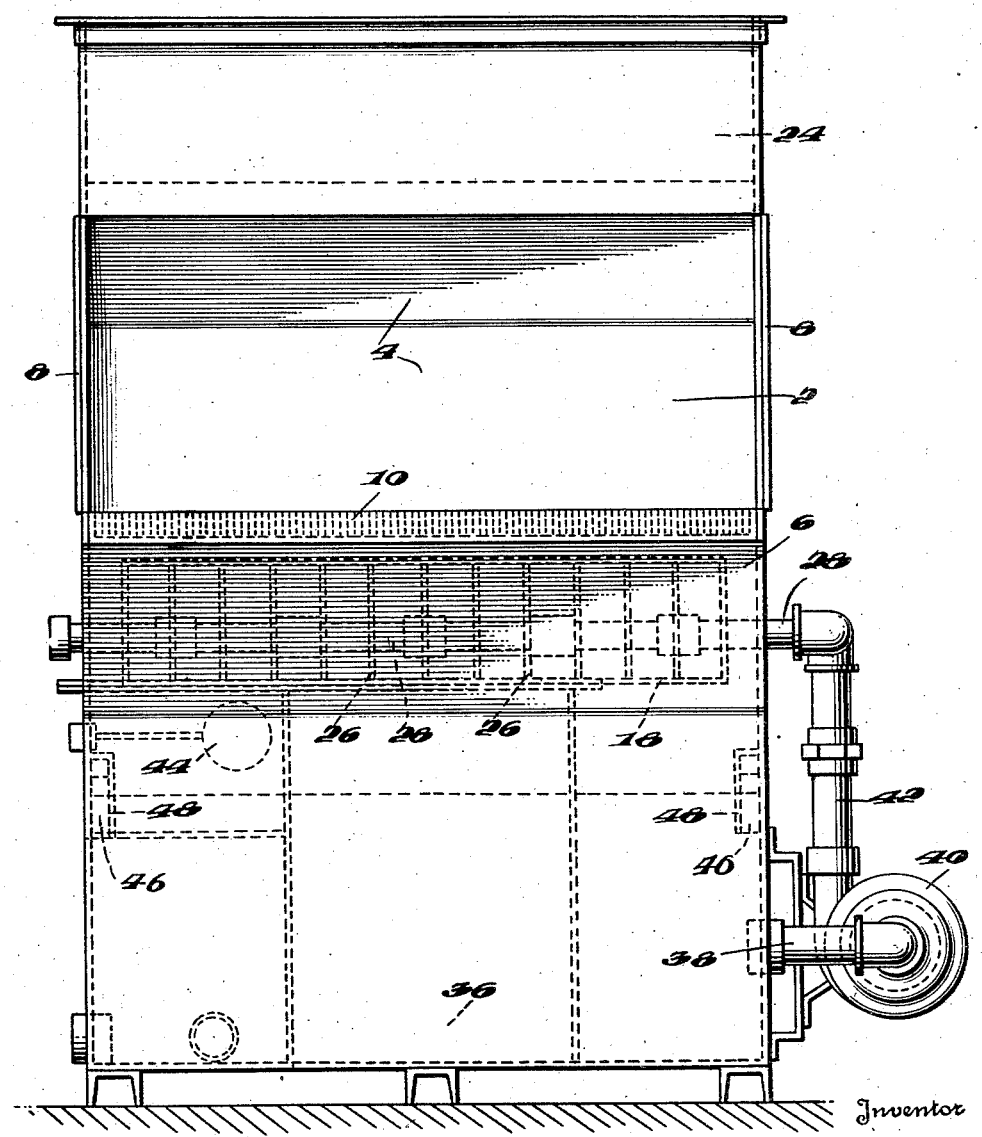

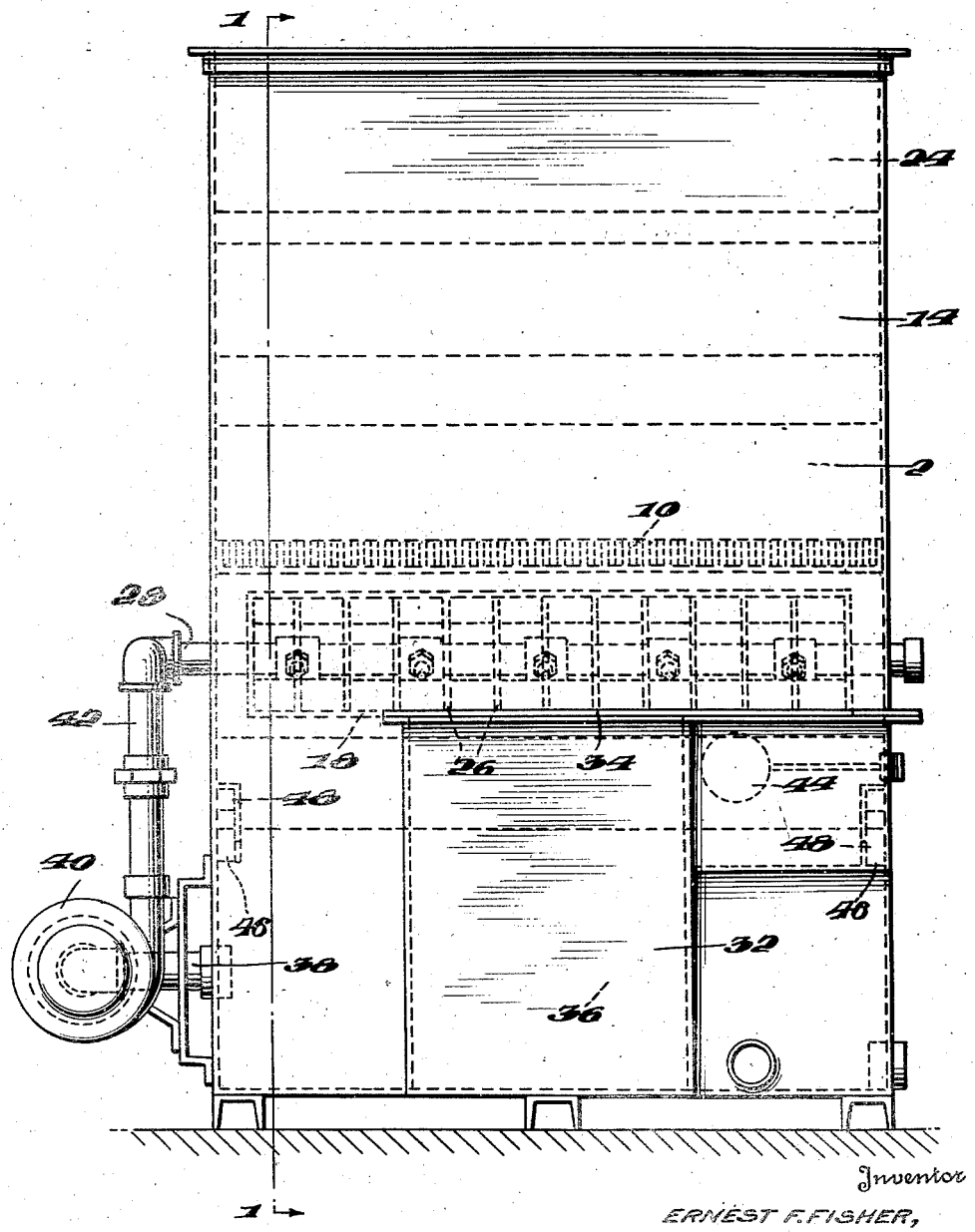

Patented Oct. 15, 1946

2,409,479

UNITED STATES PATENT OFFICE 2,409,479

GRINDING AND POLISHING BOOTH

Ernest F. Fisher, Harvey, Ill., assignor to Whiting Corporation, Harvey, Ill., a corporation of Illinois Application April 29, 1943, Serial No. 485,041

2 Claims. (Cl. 51—273)

The present invention relates to grinding and polishing booths, and more particularly to that type of booth which is designed for use in grinding and polishing castings and other parts.

The principal object of the invention is to provide a booth of this type which is an improvement upon, and has certain advantages over, previously designed booths of the same general character and is characterized by the fact that it is essentially of compact design and as the medium for wetting and precipitating the dust arising from the grinding and polishing operations utilizes a spray of water which additionally serves to create such a flow of air through the booth that dust laden air is drawn into it and clean air is expelled therefrom.

The invention is preferably embodied in a grill-equipped work booth comprising a dust inlet and spray chamber into which the dust falls from the grinding or polishing operations taking place on the grill of the booth. This inlet and spray chamber is defined in part by a vertical wall which, in cooperation with the rest of the booth casing forms an outlet chamber for clean air on the other side of the wall, the two chambers being connected by a Venturi passage.

A horizontal spray of water is projected across the inlet and spray chamber in a generally horizontal direction through the Venturi passage and into the outlet chamber, such spray, in cooperation with the venturi, creating a strong air flow into the outlet chamber and consequently a strong downward suction through the grill and into the inlet and spray chamber, so that the dust in the spray chamber is wetted by the horizontal, lateral spray, the heavier particles falling downwardly in the spray chamber, while the other particles are carried through the venturi, thoroughly wetted therein and thence carried into the outlet chamber where they are further wetted and precipitated as sludge.

A water-containing tank or sludge chamber is provided, common to the spray and outlet chambers, the wall dividing the two chambers dipping into the liquid in the sludge chamber to make a water seal. There is also provided below the sludge chamber and separated therefrom by a diagonal wall, a clean water chamber. The dust, usually metallic, in the sludge chamber settles in the lower part of that chamber and may be cleaned out as sludge therefrom. The relatively clear water in the upper part of the chamber flows through suitable passages into the clean water chamber, from whence it is picked up by a pump and projected as the lateral or horizontal spray in the spray chamber, as described above.

The Venturi passage is elongated horizontally and is provided with vertical vanes arranged in the direction of air flow.

The main features of the invention having been outlined, further details of construction and operation will be described in connection with the accompanying drawings illustrating the present preferred embodiment of the invention.

In these drawings:

Fig. 1 is a vertical section through a grinding and polishing booth embodying one form of the present invention, such section being taken on the line 1—1 of Fig. 3;

Fig. 2 is a front view of the booth of Fig. 1;

Fig. 3 is a back view; and

Fig. 4 is a fragmentary section of a modification.

Referring now to Figs. 1 to 3 of these drawings, the booth comprises an inlet and spray chamber 2 which is defined by a generally vertical wall 4, a front wall 6 and side walls 8. In chamber 2 is positioned a horizontal grill 10 serving as a work bench on which, or just above which, the grinding and polishing operations take place.

The lower edge of the vertical wall 4 dips into a water-containing sludge chamber 12 which is defined in part by the lower portion of the casing wall 14 and in addition by a diagonal wall 16.

The wall 4 is provided with a large horizontally disposed generally rectangular opening 18 and in this opening is positioned a Venturi tube 20. The latter connects or establishes communication between the inlet chamber 2 and a clean air outlet chamber 22 which is disposed between the walls 4 and 14 and has in the upper part thereof spray eliminator plates 24. Sludge chamber 12 is common to the inlet and spray chamber 2 and the clean air outlet chamber 22. The Venturi tube 20 is horizontally elongated and contains a number of vertically positioned substantially parallel vanes 26 for controlling the air flow through the Venturi tube.

Water from a pipe 28 which is positioned in the front portion of the inlet and spray chamber 2 projects a fan-like spray of water from a plurality of nozzles 30 across the chamber 2, through the Venturi tube and into the outlet chamber 22, this spray, in cooperation with the Venturi tube, creating a strong downward air suction in chamber 2 and through the grill 10.

Sludge collecting in the sludge chamber 12 progresses down the diagonal wall 16 from which it may be removed through a clean-out hopper 32 having a cover 34.

Below the sludge chamber 12 and on the underside of the diagonal wall 16 there is a clean water chamber 36. A suction pipe 38 leading to a pump 40 pumps water from the chamber 36 through a pipe 42 into the pipe 28, from whence it is projected through the nozzles 30 and thence into and through the Venturi tube 20, as already described.

A conventional float valve control for keeping the water level in the sludge chamber substantially uniform, is shown at 44.

The metallic dust in the sludge chamber 12 settles rapidly toward the deep end, leaving the water in the upper part of the chamber relatively clear. Passages 46 are provided in the diagonal wall 16 for allowing this relatively clear water to flow from the upper part of the sludge chamber 12 to the chamber 36, L-shaped guard plates 48 being associated with such passages to hold back any sludge that might tend to flow through the passages.

In use, the grinding or polishing operation, taking place on or above the grill 10, creates dust which is sucked downwardly into the inlet and spray chamber 2 by the action of the water spray through the Venturi tube 20. The dust falls into the water spray, some of it being wetted thereby and falling directly into the sludge chamber 12, while the rest of the dust is projected through the Venturi tube, past the vanes 26 and against the wall 14 of the casing, thereby being thoroughly wetted, the wet dust falling into the sludge chamber. Any dust particles tending to pass upwardly are driven against a deflector plate 50 against which they stick, the air passing upwardly through the spray eliminator plates 24 in a clean condition.

The sludge that collects in the chamber 12 is cleaned out from time to time through the cleanout hopper 32. Substantially clean water is delivered to the chamber 36 for projection by the pump through the nozzles 30.

In the modification shown in Fig. 4, the Venturi tube 52, instead of being directed substantially horizontally as in Fig. 1, is curved upwardly toward the guard plate 50. The Venturi tube 52 is provided with vertical vanes or partitions 26 like those used in the Venturi tube 20.

While the invention has been described in connection with the cleaning of air by means of a water spray, it should be understod that gases other than dusty air may be cleaned by this apparatus and that liquids other than water may be used.

While the preferred embodiment of the invention has been shown in some detail, it should be understood that the invention is not limited to these exact details, but may be carried out in other ways.

I claim as my invention:

1. A grinding and polishing booth comprising an upright casing having a sump in the bottom thereof for a body of water, an upstanding open top air inlet chamber in its front portion and above and communicating with the sump, and an upstanding open top air outlet chamber in its back portion and above and communicating with said sump, and embodying a work supporting grill across the open top of the air inlet, a vertically extending cross wall extending between and serving to separate the inlet and outlet chambers and having the lower end thereof dipping into the sump to form a water seal between the lower portions of the two aforementioned chambers, and a diagonally extending wall disposed in the sump, serving to define a sludge compartment above it and a clear water compartment beneath it, and having means at the upper portion thereof for permitting clear water from the sludge compartment to flow into the clear water compartment; a horizontally elongated Venturi tube extending transversely through the cross wall at a point above the sump and serving to connect the two chambers; and means operative to spray liquid horizontally through the Venturi tube into the outlet chamber and thereby cause air to flow downward past the grill and into the inlet chamber and thence upward through the outlet chamber, and including a horizontally extending nozzle-equipped pipe disposed in the inlet chamber adjacent the Venturi tube and a pump arranged to pump water from the clear water compartment to the pipe.

2. A grinding and polishing booth comprising an upright casing having a sump in the bottom thereof for a body of water, an upstanding open top air inlet chamber in its front portion and above and communicating with the sump, and an upstanding open top air outlet chamber in its back portion and above and communicating with said sump, and embodying a work supporting grill across the open top of the air inlet, a vertically extending cross wall extending between and serving to separate the inlet and outlet chambers and having the lower end thereof dipping into the sump to form a water seal between the lower portions of the two aforementioned chambers, and a diagonally extending wall disposed in the sump, serving to define a sludge compartment above it and a clear water compartment beneath it, and having means at the upper portion thereof for permitting clear water from the sludge compartment to flow into the clear water compartment; a horizontally elongated Venturi tube extending transversely through the cross wall at a point above the sump, serving to connect the two chambers and provided thereon with a longitudinal series of transversely extending equidistantly spaced vanes; and means operative to spray liquid horizontally through the Venturi tube into the outlet tube and thereby cause air to flow downwards past the grill and through the inlet chamber and thence upwards through the outlet chamber and out the open top of the latter, and including a horizontally extending pipe disposed in the inlet chamber in opposed and parallel relation with the Venturi tube and provided with a longitudinal series of nozzles extending towards the tube and positioned opposite the spaces between the vanes, respectively, and a pump arranged to supply water under pressure from the clear water compartment to the pipe.

ERNEST F. FISHER.